(12) United States Patent
Peng

(10) Patent No.: US 6,580,759 B1
(45) Date of Patent: Jun. 17, 2003

(54) SCALABLE MPEG-2 VIDEO SYSTEM

(75) Inventor: Shaomin Peng, Yorktown, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 432 days.

(21) Appl. No.: 09/713,866

(22) Filed: Nov. 16, 2000

(51) Int. Cl.$^7$ .............................................. H04N 7/50
(52) U.S. Cl. ............................ 375/240.25; 375/240.29
(58) Field of Search ..................... 375/240.25, 240.29; H04N 7/50

(56) References Cited

U.S. PATENT DOCUMENTS

| 5,668,599 A | 9/1997 | Cheney et al. ......... 375/240.15 |
| 5,903,311 A | 5/1999 | Ozcelik et al. ......... 375/240.02 |
| 5,982,431 A | 11/1999 | Chung .................... 375/240.01 |
| 6,519,288 B1 * | 2/2003 | Vetro et al. ............. 375/240.29 |

FOREIGN PATENT DOCUMENTS

| EP | 0707426 A2 | 4/1996 | ............ H04N/7/26 |
| WO | WO9422108 | 3/1994 | ............ G06K/9/36 |
| WO | WO9636178 | 11/1996 | ............ H04N/7/12 |

OTHER PUBLICATIONS

M. Mattavelli et al; "Computational Graceful Degradation for Video Sequence Decoding", Image Prcessing, 1997, Proceedings, International Conference on Santa Barbara, CA, 10/26–29/1997, pp. 330–333, XP010254175.

* cited by examiner

Primary Examiner—Howard Britton
(74) Attorney, Agent, or Firm—Russell Gross

(57) ABSTRACT

A system and method for scaling a video system, such as an MPEG-2 video decoder, utilizing an improved data pruning implementation. A scalable data processing system is provided, comprising: a sequential data path for processing multimedia data, including a first processing module and a second processing module; a scalable application for scaling the second processing module; and a data pruning system positioned prior to the first processing module that causes a portion of the multimedia data associated with the scaling application to be truncated.

20 Claims, 2 Drawing Sheets

SCALABLE MPEG-2 VIDEO SYSTEM

BACKGROUND OF THE INVENTION

1. Technical Field

The present invention relates to processing compressed video signals, and more particularly relates to a system and method for scaling an MPEG-2 video decoder.

2. Related Art

The MPEG standards are an evolving set of standards for video and audio compression developed by the Moving Picture Experts Group (MPEG). MPEG-1 was designed for coding progressive video at a transmission rate of about 1.5 million bits per second. It was designed specifically for Video-CD and CD-i media. MPEG-2 was designed for coding interlaced images at transmission rates above 4 million bits per second. The MPEG-2 standard is used for various applications, such as digital television (DTV) broadcasts, digital versatile disk (DVD) technology, and video storage systems.

According to the MPEG-2 standard, a video sequence is divided into a series of GOPs (Group Of Pictures). Each GOP begins with an Intra-coded picture (I picture) followed by an arrangement of forward Predictive-coded pictures (P pictures) and Bi-directionally predictive-coded pictures (B pictures). I pictures are fields or frames coded as a stand-alone still image. P pictures are fields or frames coded relative to the nearest I or P picture, resulting in forward prediction processing. P pictures allow more compression than I pictures through the use of motion compensation, and also serve as a reference for B pictures and future P pictures. B pictures are coded with fields or frames that use the most proximate past and future I and P pictures as a reference, resulting in bi-directional prediction.

As the digital TV market gradually begins to dominate the TV market and other video applications become more desirable, the demand for systems having advanced capabilities for processing MPEG-2 pictures becomes stronger and stronger. The current emerging architecture for processing MPEG-2 pictures, such as that found in DTV set-top boxes and high end digital TV's, typically utilize a combination of a digital signal processing central processing units (DSPCPU), control processors, coprocessors, and software applications. Unfortunately, even with all these resources, advanced audio/visual processing functions tend to consume more computational power than is often available.

One of the key elements in MPEG-2 processing is the MPEG-2 decoder, which converts a bitstream of compressed MPEG-2 data into pixel images. The main components of a generic MPEG-2 decoder 10 are shown in FIG. 1. There are four functional blocks: a variable length decoder (VLD) 12, an inverse quantization (IQ) system 14, an inverse discrete cosine transform system (IDCT) 16, and a motion compensation (MC) system 18. Memory 20 is used to store the reference frames. The adder combines the error residuals output from IDCT 16 (path 1) with motion compensation results (path 2) to form the final video output 24. Unfortunately, each of these functional components consume a significant amount of computational power, which drives up the cost, and limits the flexibility of digital video systems using MPEG-2 technology. Accordingly, making a highly efficient, cost effective decoder remains one of the main goals of all electronics manufacturers.

One solution for addressing the processing requirements of MPEG-2 decoders is to provide specialized hardware systems that increase computational power. For example, U.S. Pat. No. 5,903,311, issued to Ozcelik et al. on May 11, 1999, which is hereby incorporated by reference, describes a chip that includes specialized circuits for an MPEG-2 decoder. Unfortunately, while overall hardware costs continue to decrease, the costs involved in designing and building specialized hardware such as this increase the expense of the decoder.

A preferred solution therefore is to implement as much functionality as possible in software, which provides significant cost and flexibility advantages over hardware solutions. In particular, software solutions reduce the need for expensive hardware, such as coprocessors, and will allow multiple video functions to run concurrently on a DSPCPU core. However, software applications tend to run too slow to handle occasions when computationally intensive decoding operations are required. Accordingly, a need exists to provide enhanced systems that will provide inexpensive MPEG-2 decoder solutions while maintaining an acceptable level of video quality.

SUMMARY OF THE INVENTION

This invention overcomes the above-mentioned problems, as well as others, by providing a data processing system that includes at least one scaling application for selectively scaling the complexity of the data processing system. In a first aspect, the invention provides a scalable decoder system, comprising: a processing path for processing video data, having a variable length decoder (VLD), an inverse quantization (IQ) system, and an inverse discrete cosine (IDCT) system arranged in a sequential manner; a scaling application incorporated into the IDCT system for scaling at least one computational process of the IDCT system; and a data pruning system residing within the processing path between the VLD and the IQ system that causes a type of the video data associated with the at least one computational process to be truncated.

In a second aspect, the invention provides a scalable data processing system, comprising: a sequential data path for processing multimedia data, including a first processing module and a second processing module; a scaling application for scaling the second processing module; and a data pruning system positioned prior to the first processing module that causes a portion of the multimedia data associated with the scaling application to be truncated.

In a third aspect, the invention provides a method for scaling a data processing system having a first processing module and a second processing module arranged in a sequential manner, comprising the steps of: inputting data into the data processing system; scaling a computational process in the second processing module; and truncating a predetermined type of data prior to the first processing module that is associated with the computational process in the second processing module.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF THE DRAWINGS

Figure 1:
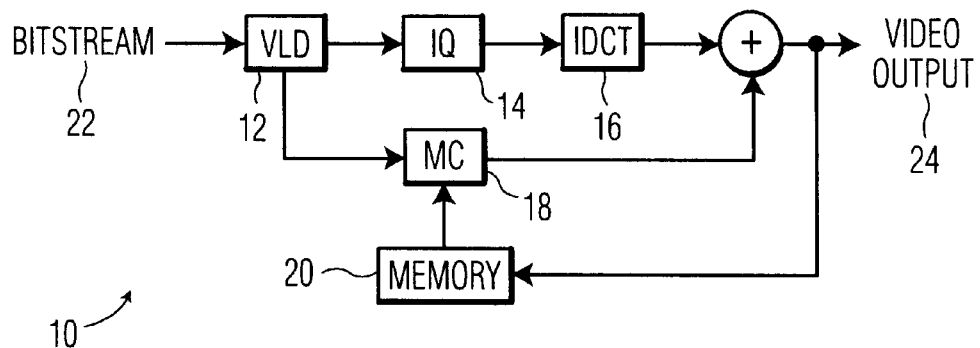
FIG. 1 depicts a functional diagram of a generic video decoder.

A generic MPEG-2 decoder 10, as shown in FIG. 1, decodes an MPEG-2 bitstream 22 with four functional blocks and an adder. The functional blocks include a variable length decoder (VLD) 12, an inverse scan and inverse quantization (IQ) system 14, an inverse discrete cosine transform (IDCT) system 16, and a motion compensation (MC) system 18. In order to provide a more efficient system, each of the above functional blocks within the decoder 10 can potentially be "scaled" to reduce the computational requirements of the particular block. Different scaling algorithms or applications have been proposed to selectively reduce the computational requirements, or complexity, of a given functional block. In general, scaling applications reduce the complexity of a functional block by reducing one or more computational processes, e.g., reducing certain processing steps and/or the processing of certain types of data. The price paid for reducing complexity is that such scaling applications will generally cause some degradation to the output quality. Accordingly, the implementation of a scaling application must be chosen appropriately so as to balance computational reduction and output quality. To achieve this, a local resource controller can be utilized to decide the individual scalability of each functional block in order to meet an overall required complexity for the decoder. For example, the local resource controller may decide to scale just the IDCT system 16 in order to achieve a desired complexity level for the whole MPEG-2 decoder. The present invention makes the process even more efficient by managing the scalability at the decoder level, rather than simply at the functional block level. An exemplary embodiment for achieving this is described in detail below with reference to FIG. 3.

Figure 2:
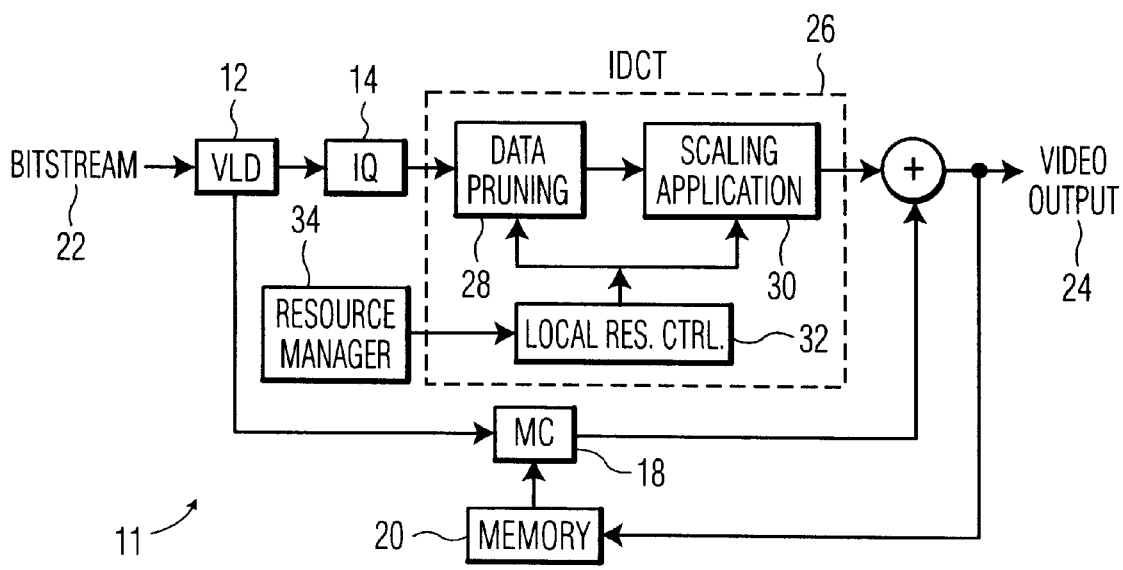
FIG. 2 depicts a scalable IDCT block within a video decoder.

Referring first to FIG. 2, a decoder 11 is shown containing a scalable IDCT block 26. Scalable IDCT block 26 comprises a data pruning system 28, a scaling application 30, and a local resource controller 32. In operation, local resource controller 32 receives commands from a resource manager 34, which dictates the overall complexity requirements for decoder 11 (i.e., the amount of computational resources available for decoder 11). Based on these requirements, local resource controller 32 implements a scaling strategy to meet the requirements. In the case shown in FIG. 2, the IDCT block 26 is scaled using scaling application 30. In addition, as part of the scaling operation, local resource controller 32 may also cause data associated with the scaling application to be truncated using data pruning system 28. Data pruning system 28 eliminates data that would otherwise be ignored due to the implementation of scaling application 30. For instance, data pruning system 28 may eliminate predetermined blocks of data (e.g., those associated with B pictures), patterns of data found in predetermined blocks, or data inside a macroblock.

The scaling operation of FIG. 2 is however local since the complexity only starts to reduce when the data flow arrives to the scalable function, i.e., IDCT block 26. While the scaling performed therein contributes to the total scalability of decoder 11, there is no change for the total decoder complexity before the data reaches the IDCT block 26. For example, if the scalable IDCT block 26 only has $\gamma\%$ of its total resources available, a scalable algorithm will need to truncate the input data in a pre-defined manner to reduce the computational load to $\gamma\%$ or less of the original complexity. The data truncation happens right after the data enters into IDCT block 26 and before the IDCT operation starts. As a result, VLD 12 and IQ 14 processed the truncated data even though the truncated data has no bearing on the video output 24.

Figure 3:
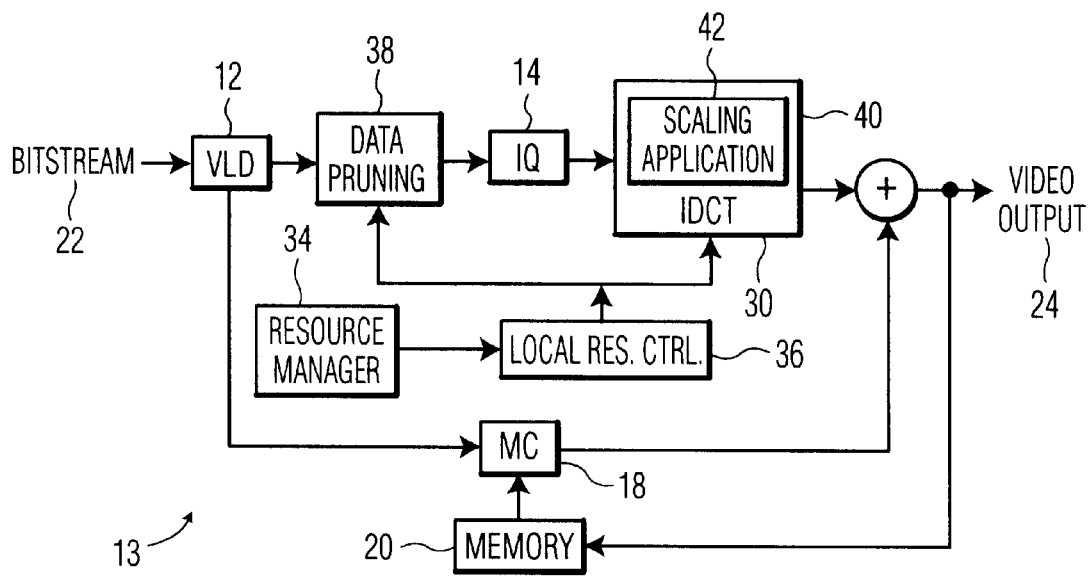
FIG. 3 depicts a scalable video decoder in accordance with a preferred embodiment of the present invention.

As shown in FIG. 3, a modified MPEG-2 decoder 13 is provided that further reduces the overall complexity by moving data pruning system 38 to an earlier point in the processing path containing scalable IDCT block 40. In particular, data pruning system 38 has been moved to a point after VLD 12 and before IQ 14. Data pruning system 38 is preferably located after VLD 12 since VLD 12 converts the input data 22 into a macroblock (MB) format that is maintained throughout the processing path. By locating the data pruning system 38 after VLD 12, a corresponding format exists for both the data arriving at data pruning system 38 and data arriving at IDCT block 40, thereby making it possible to identify data that requires truncation.

The process of truncating data within data pruning system 38 includes the step of identifying macroblock (MB) headers. Then, for a given MB, each associated block can be examined and a predetermined pattern of data can be truncated based on instructions from the local resource controller 36. Truncation may involve truncating entire blocks of data of a predetermined type, patterns of data within a block, or any other specified portions or types of data. Similar to the data pruning operation of the decoder 11 shown in FIG. 2, data truncation is driven by a corresponding scaling application as chosen by local resource controller 36. Thus, for any given scaling application, an associated type or pattern of data may be eliminated.

Comparing decoder 11 of FIG. 2 to the modified decoder 13 of FIG. 3, it.can be seen that decoder 13 provides a more efficient approach. In particular, by relocating the data pruning system 38 as shown in FIG. 3, the computational requirements of IQ 14 are reduced when a scalable IDCT block is implemented, since IQ 14 will process less data. Accordingly, by moving the data pruning system from the IDCT block 40 to a point prior to the IQ 14 system, an extra savings of complexity is achieved. Using the scalable IDCT block as an example, the complexity analysis is shown as follows. Assume C represents the complexity of the decoder and Cn represents the complexity of the various functional blocks, i.e., n={VLD, IQ, IDCT, MC, and $\oplus$}. Then the total complexity of the generic MPEG-2 decoder 10 of FIG. 1 is:

$$C = C_{VLD} + C_{IQ} + C_{IDCT} + C_{MC} + C_{\oplus},$$

Assume the IDCT block is the only scalable block in the MPEG-2 decoder 11 in FIG. 2. If the complexity level of the IDCT block is set to γ%, the complexity for decoder 11 is calculated as:

$$C_2 = C_{VLD} + C_{IQ} + \gamma\% \cdot C_{IDCT} + C_{MC} + C_\oplus.$$

If the data pruning is moved to a point before IQ 14, as shown in FIG. 3, the complexity is further reduced to:

$$C_3 = C_{VLD} + \beta\% \cdot C_{IQ} + \gamma\% \cdot C_{IDCT} + C_{MC} + C_\oplus.$$

Where β% represents the percentage of complexity required by $C_{IQ}$ in light of the data pruning operation. Accordingly, a complexity savings of $C_{IQ} - (\beta\% \cdot C_{IQ})$ is achieved by decoder 13 of FIG. 3 relative to decoder 11 of FIG. 2.

Figure 4:
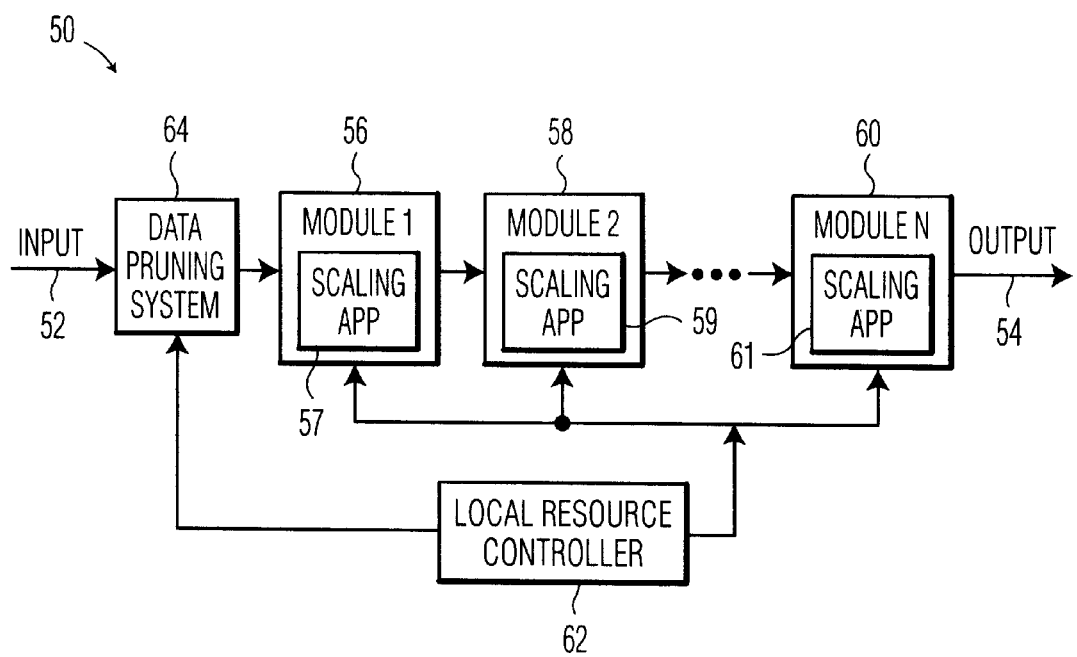
FIG. 4 depicts a data processing path comprising a scalable system in accordance with the present invention.

Although the above description is described with reference to the decoder 13 having only a scalable RDCT block, it is understood that this invention could apply to any data processing system in which sequentially arranged scalable modules are utilized. Referring to FIG. 4, a generic data processing path 50 is shown for receiving input 52 (e.g., multimedia data) and outputting output 54 (e.g., processed multimedia data). Path 50 comprises n sequentially arranged processing modules 56, 58 and 60, and each module has a corresponding scaling application 57, 59, and 61 that can be activated to reduce the complexity of the module. Local resource controller 62 is provided to activate each or any of the scaling applications 57, 59, and 61, as deemed necessary. In addition, a data pruning system 64 is provided to truncate data associated with an activated scaling application. Data associated with a scaling application may include, for example, data that will not be processed, or data that would otherwise be eliminated by the scaling application.

Thus, for example, if it is known that scaling application 61 will eliminate the processing of a predetermined type of data, local resource controller 62 will cause data pruning system 64 to truncate all instances of the predetermined type of data before the data enters processing path 50. Accordingly, the complexity associated with each prior processing module, namely modules 56 and 58, will be reduced. This concept can be implemented in any data processing system, including a multimedia decoder or encoder.

It is understood that systems and modules described herein can be implemented in hardware, software, or a combination of hardware and software. They may be implemented by any type of computer system—or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

I claim:

1. A scalable decoder system, comprising:
    a processing path for processing video data, having a variable length decoder (VLD), an inverse quantization (IQ) system, and an inverse discrete cosine (IDCT) system arranged in a sequential manner;
    a scaling application incorporated into the IDCT system for scaling at least one computational process of the IDCT system; and
    a data pruning system residing within the processing path between the VLD and the IQ system that causes a type of the video data associated with the at least one computational process to be truncated.

2. The scalable decoder system of claim 1, further comprising a local resource controller for selectively activating the scaling application and the data pruning system.

3. The scalable decoder system of claim 2, wherein the scaling application causes the at least one computational process not to process a predetermined block of the video data.

4. The scalable decoder system of claim 3, wherein the local resource controller instructs the data pruning system to truncate the predetermined block of video data.

5. The scalable decoder system of claim 4, wherein the predetermined block of video data is truncated in a pattern predetermined by the local resource controller.

6. The scalable decoder system of claim 1, wherein the scalable decoder system comprises a scalable MPEG-2 decoder.

7. A scalable data processing system, comprising:
    a sequential, data path for processing multimedia data, including a first processing module and a second processing module;
    a scaling application for scaling the second processing module; and
    a data pruning system positioned prior to the first processing module that causes a portion of the multimedia data associated with the scaling application to be truncated.

8. The scalable data processing system of claim 7, further comprising a local resource controller for selectively activating the scaling application and the data pruning system.

9. The scalable data processing system of claim 7, wherein the first processing module comprises an inverse quantization system, and the second processing module comprises an inverse discrete cosine transform system.

10. The scalable data processing system of claim 9, wherein the scalable data processing system comprises a scalable MPEG-2 decoder.

11. The scalable data processing system of claim 7, wherein the scalable data processing system comprises a scalable MPEG-2 encoder.

12. The scalable data processing system of claim 8, wherein the data pruning system comprises a system for truncating data inside a macroblock of compressed video data.

13. The scalable data processing system of claim 12, wherein the data is truncated in a pattern predetermined by the local resource controller.

14. The scalable data processing system of claim 13, wherein the scaling application causes the second processing module not to process truncated data.

15. A method for scaling a data processing system having a first processing module and a second processing module arranged in a sequential manner, comprising the steps of:

inputting data into the data processing system;

scaling a computational process in the second processing module; and truncating a predetermined type of data prior to the first processing module that is associated with the computational process in the second processing module.

16. The method of claim 15, wherein the step of scaling the computational process in the second processing module includes the step of eliminating the processing of the predetermined type of data.

17. The method of claim 15, wherein the first processing module comprises an inverse quantization system, and the second processing module comprises an inverse discrete cosine transform system.

18. The method of claim 16, wherein the data comprises compressed video data.

19. The method of claim 18, wherein the scaling step truncates data inside a macroblock of the compressed video data.

20. The method of claim 19, wherein the block of data is truncated in a pattern predetermined by a local resource controller.

* * * * *